Dec. 29, 1964  F. SALZ ETAL  3,163,798
PARTICLE RANDOMIZER
Filed Jan. 3, 1961  4 Sheets-Sheet 1

INVENTORS
FRANK SALZ
RUSSELL G. MEYERAND JR.
BY David S. Fishman
AGENT

Dec. 29, 1964  F. SALZ ETAL  3,163,798
PARTICLE RANDOMIZER
Filed Jan. 3, 1961  4 Sheets-Sheet 2

PARTICLE TRAJECTORY

PARTICLE TRAJECTORY

INITIAL CONDITIONS
$K_B = .075$ WEBERS/$M^2$

| $V_{\perp O}$ (M/SEC) | $V_{ZO} = 3 \times 10^5$ M/SEC. | $V_{ZO} = 9 \times 10^5$ M/SEC. |
|---|---|---|
| 0 | ○ | ● |
| $10^4$ | △ | ▲ |
| $3 \times 10^4$ | □ | ■ |

GEOMETRIC MODEL PREDICTION  ———   ----

INVENTORS
FRANK SALZ
RUSSELL G. MEYERAND JR.
BY David S. Fishman
AGENT

Dec. 29, 1964  F. SALZ ETAL  3,163,798
PARTICLE RANDOMIZER
Filed Jan. 3, 1961  4 Sheets-Sheet 4

INVENTORS
FRANK SALZ
RUSSELL G. MEYERAND JR.
BY David S. Fishman
AGENT

United States Patent Office 3,163,798
Patented Dec. 29, 1964

3,163,798
PARTICLE RANDOMIZER
Frank Salz, West Hartford, and Russell G. Meyerand, Jr., Glastonbury, Conn., assignors to United Aircraft Corporation, East Hartford, Conn., a corporation of Delaware
Filed Jan. 3, 1961, Ser. No. 80,101
7 Claims. (Cl. 315—111)

This invention relates to a particle randomizer. More particularly it relates to a novel method and apparatus for converting lineal motion of charged particles to rotational motion; or as can be alternatively stated, a novel method and apparatus for transforming directed axial kinetic energy of charged particles into kinetic energy of rotation.

One use contemplated for this invention is in connection with the production of a controlled thermonuclear reaction. Under special conditions of very high temperature and pressure, particles of matter can be brought together and caused to collide, thereby undergoing fusion with an attendent release of large amounts of nuclear energy. However, it is difficult to cause the desired collisions between particles and to obtain a sufficient number of collisions or rate of collision to produce or sustain the thermonuclear reaction as a source of useful power.

The present invention discloses a novel method and apparatus for increasing the number of collisions between particles of matter. A high-energy plasma beam, i.e. one which is completely ionized and has high kinetic energy, is created having a lineal component of velocity. The method and apparatus for creating such a beam are well known in the art, and reference is made to U.S. Patent 2,798,181 for an example of suitable apparatus. In such a high-energy, directed velocity plasma, the particles all have a substantial lineal component of motion and all travel at approximately the same lineal velocity. Therefore, the probability of collision between particles is remote. In the present invention a high-energy plasma beam is subjected to the influence of a cusped magnetic field. The cusped magnetic filed transforms the directed plasma into a thermalized or quasithermalized plasma, i.e. one in which the particle motion is random or nearly random. The random motion of the particles greatly increases the probability of particle collision.

Accordingly, one feature of this invention is a novel method and apparatus for converting the lineal velocity or axial kinetic energy of a charged particle to rotational velocity or rotational kinetic energy.

Another feature of this invention is a novel method and apparatus for significantly increasing the probability of collisions between particles of matter.

Another feature of this invention is a novel method and apparatus for converting the lineal velocity or axial kinetic energy of a charged particle to rotational velocity or rotational kinetic velocity by the use of a cusped magnetic field.

Still another feature of this invention is a novel method and apparatus for increasing collisions between particles in a group of moving particles by converting the lineal motion of the particles to rotational motion.

Other features and advantages will be apparent from the specification and claims, and from the accompanying drawings which illustrate an embodiment of the invention.

Figure 1A:
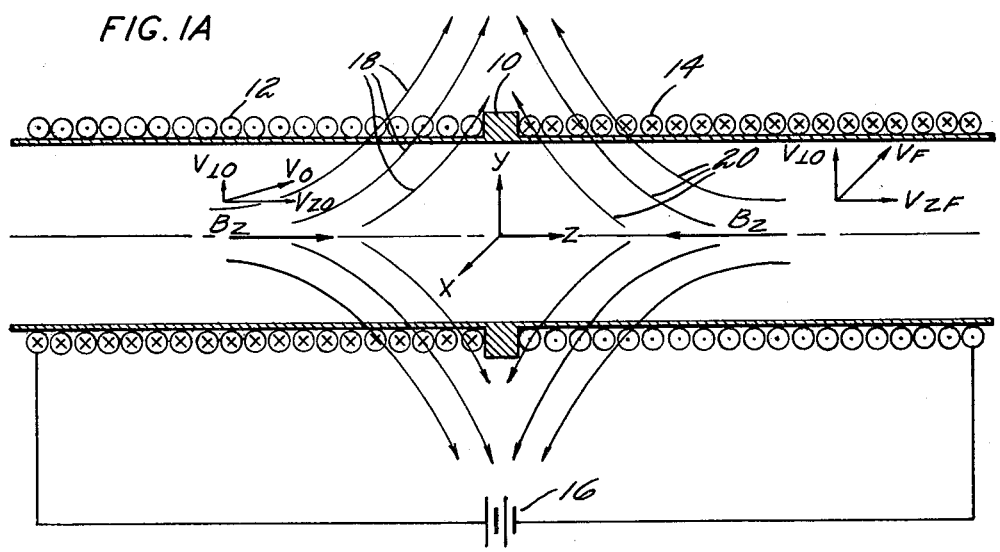
FIG. 1A is a detail of the apparatus of FIG. 1.
Figure 1:
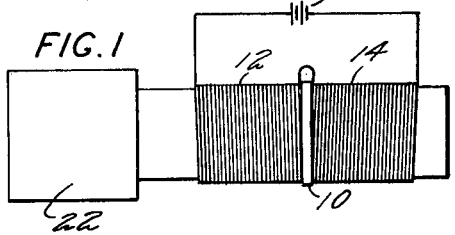
FIG. 1 is a view of the apparatus used in the practice of the present invention.

Referring to FIGS. 1 and 1A, the apparatus involved in the present invention includes a chamber or tube 10 which may be substantially evacuated. Tube 10 is surrounded by two coils 12 and 14 which are connected to a source of current 16. Coils 12 and 14 are wound in such a manner, or current is passed through coils 12 and 14 in such a manner that the poles of the magnetic fields setup by the coils when current is passed through the coils are opposing. Lines of force of coil 12 are indicated at 18, and lines of force of coil 14 are indicated at 20. Lines of force 18 and 20 represent either both north or both south poles of the magnetic fields of coils 12 and 14 respectively, and in FIG. 1A they represent north poles. Coils 12 and 14 are disposed so that their magnetic fields are adjoining at the north poles to create a cusped magnetic field. A high-energy plasma is generated in a plasma generator 22 and is directed into tube 10, the charged particles of the plasma moving along paths which have a component of motion ($V_z$) parallel to the axis of tube 10. Plasma generator 22 is of well-known construction, such as, for example, the apparatus shown in U.S. Patent 2,798,181.

Figure 2:
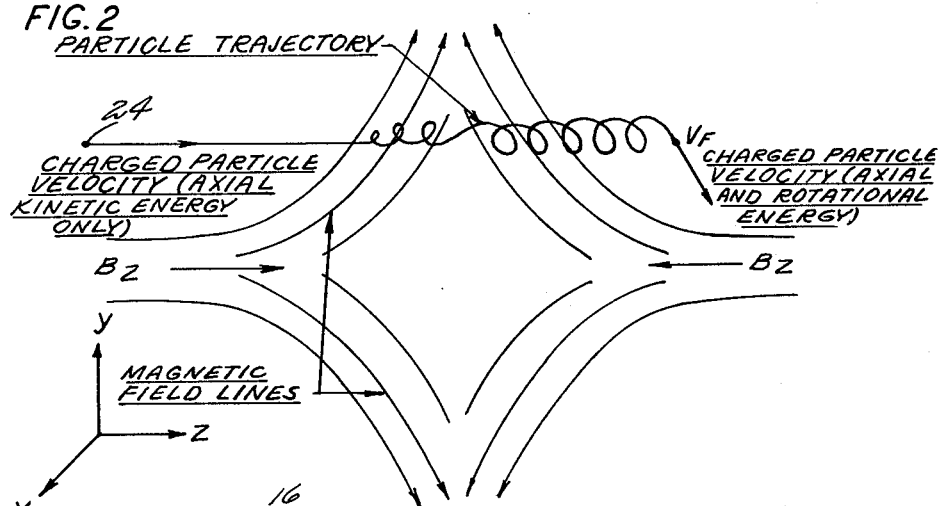
FIG. 2 is an illustration of the trajectory of a charged particle in a cusped magnetic field.

FIGS. 1A and 2 show lines of force 18 and 20 forming a cusped magnetic field. Coils 12 and 14 each generate a magnetic field of a flux density of B gauss, the axis of each coil and hence the axis of each magnetic field coinciding with the axis of tube 10. The magnetic fields have components $B_x$ $B_y$ $B_z$ in the $x$, $y$, and $z$ directions respectively Referring to FIGS. 2, 3 and 4, an analysis will now be made of the behavior of constituent ions of the plasma as they pass through the cusped magnetic field. The analysis will relate only to a single ion but it is to be expressly understood that the same considerations apply to each ion of the plasma.

Ion 24 travels along tube 10 from left to right with a component of motion ($V_z$) parallel to the axis of tube 10 and at a distance ($r$) removed from the axis of tube 10. That is, when ion 24 is emitted from generator 22, it may either be traveling in a straight path parallel to the axis of tube 10, or it may also have some spiral or helical motion ($V_\perp$). In any event, ion 24 will have a component of motion ($V_z$) parallel to the axis of tube 10. Only the axial component of motion of ion 24, or as expressed otherwise, the axial kinetic energy of ion 24, will be considered in this analysis. As ion 24 enters the area of the cusp formed by the radial portions of lines 18 and 20 it will be deflected and caused to assume a path having a definite center of rotation and an effective radius of gyration R. In FIG. 2 ion 24 is depicted as spiraling in the area of the radial field merely to illustrate diagrammatically that it is assuming a curved path. When ion 24 then comes under the influence of the axial portions of lines of force 20, it will be traveling at an angle to the magnetic field and hence will be caused to rotate. Thus, some of the axial motion ($V_z$) or the axial kinetic energy of ion 24 will be converted into rotational motion ($V_\perp$) or rotational kinetic energy, which will be retained after the ion passes out of the area of the cusp.

Figure 3:
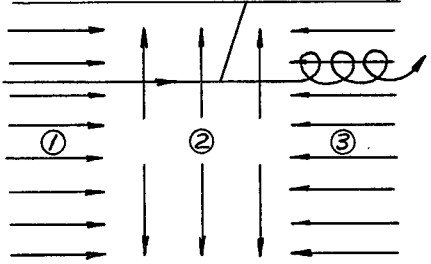
FIG. 3 is an elevation view of the trajectory of a charged particle in an idealized cusped magnetic field.
Figure 4:
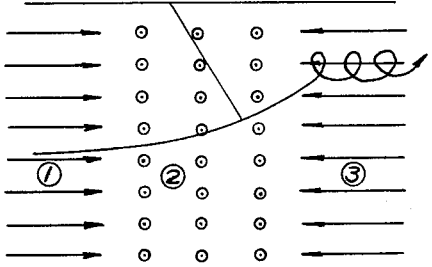
FIG. 4 is a plan view of FIG. 3.

FIGS. 3 and 4 depict an idealized model of the cusped magnetic field. It is assumed that there are three distinct regions of the cusp, region 1 having only an axial component of the magnetic field ($B_z$) and being equivalent to the strictly axial portion of lines of force 18, region 2 having only a radial component of the magnetic field ($B_r$) and being equivalent to the strictly radial portions of lines of force 18 and 20, and region 3 having only an axial component of the magnetic field ($B_z$) in opposition to the first and being equivalent to the strictly axial portion of lines of force 20.

As ion 24 passes through regions 1, 2 and 3 successively, its trajectory can be followed. In region 1 the particle has its velocity vector along the magnetic field and will not be deflected. However, as soon as ion 24 enters region 2 the velocity vector and the magnetic field will be at right angles to each other, and ion 24 will be forced to assume the curved trajectory shown in FIG. 4 with a radius of curvature R. When ion 24 reaches region 3 the velocity vector will be at an angle to the magnetic field, and consequently ion 24 will spiral in the magnetic field of region 3. Thus it can be seen that some of the axial motion ($V_z$) or axial kinetic energy will have been converted into rotational motion ($V_\perp$) or rotational kinetic energy, which will be retained for all subsequent travel through the tube.

Returning now to a consideration of the multitude of ions comprising the plasma, the significance of the energy conversion can be appreciated. As the ions pass through the cusp they will assume rotational orbits while still retaining some axial motion. It can be readily appreciated that the probability of collision between ions has been greatly increased due to the fact that the ions are now traveling in intersecting rotational paths as well as in a lineal direction.

The conversion of axial motion ($V_z$) or axial kinetic energy to rotational motion ($V_\perp$) or rotational kinetic energy can be treated mathematically by considering the dynamics of the particle. In the absence of an electric field the equations of motion of a charged particle can be written as $$F = m\frac{d\overline{V}}{dt} = q(\overline{V} \times \overline{B}) \qquad (1)$$

or, in Cartesian coordinates $$m\frac{dV_x}{dt} = q(V_y B_z - V_z B_y) \qquad (2)$$

$$m\frac{dV_y}{dt} = q(V_z B_y - V_x B_z) \qquad (3)$$

$$m\frac{dV_z}{dt} = q(V_x B_y - V_y B_x) \qquad (4)$$

Following the substitution of $$\frac{dx}{dt}, \frac{dy}{dt}, \frac{dz}{dt}$$

for velocities $V_x$, $V_y$ and $V_z$, respectively, three coupled second order differential equations with nonconstant coefficients are obtained.

Actual measurements of the magnetic field strength were made and it was determined that the axial component of the magnetic field did not vary appreciably with radius whereas the radial component increased linearly with the radius. This latter relationship was used to obtain the expression $$B_r = r(B_{r'}) \qquad (5)$$

where $B_r$ is the strength of the radial component of the magnetic field at any point, $r$ is the distance from the common axis of tube 10 and the magnetic field to the point in question, and $B_{r'}$ is the measured value of the magnetic field at a point divided by the distance from that point to the aforementioned common axis.

Conservation of flux requires that all lines of force leaving the north pole of a magnetic field must return through the south pole. This can be expressed $$\nabla \cdot \overline{B} = 0 \qquad (6)$$

Expressing Equation 6 in cylindrical coordinates, it becomes $$\frac{1}{r}\frac{\partial}{\partial r}(rB_r) + \frac{\partial B_\theta}{\partial \theta} + \frac{\partial B_z}{\partial Z} = 0 \qquad (7)$$

Since there is rotational symmetry in a cusped magnetic field, $$\frac{\partial B_\theta}{\partial \theta} = 0 \qquad (8)$$

Substituting Equation 8 in Equation 7 results in the relationship $$\frac{1}{r}\frac{\partial}{\partial r}(rB_r) + \frac{\partial B_z}{\partial Z} = 0 \qquad (9)$$

or $$\frac{B_r}{r} + \frac{\partial B_r}{\partial r} + \frac{\partial B_z}{\partial Z} = 0 \qquad (10)$$

Substituting Equation 5 in Equation 10 results in the relationship $$B_{r'} + B_{r'} + \frac{\partial B_z}{\partial z} = 0 \qquad (11)$$

or $$\frac{\partial B_z}{\partial Z} = -2B_{r'} \qquad (12)$$

Since Equation 12 revealed a simple differential relationship between the radial magnetic field at a point ($B_{r'}$) and the axial magnetic field, the axial magnetic field can be determined for any specified radial field. In addition, the magnetic field was divided by a factor $K_B$ to produce a non-dimensional factor to simplify the analysis. The resulting magnetic field plots are shown in FIG. 7.

In order to solve the differential equations of motion, Equations 1–4, the following parameters were specified.

Figure 7:
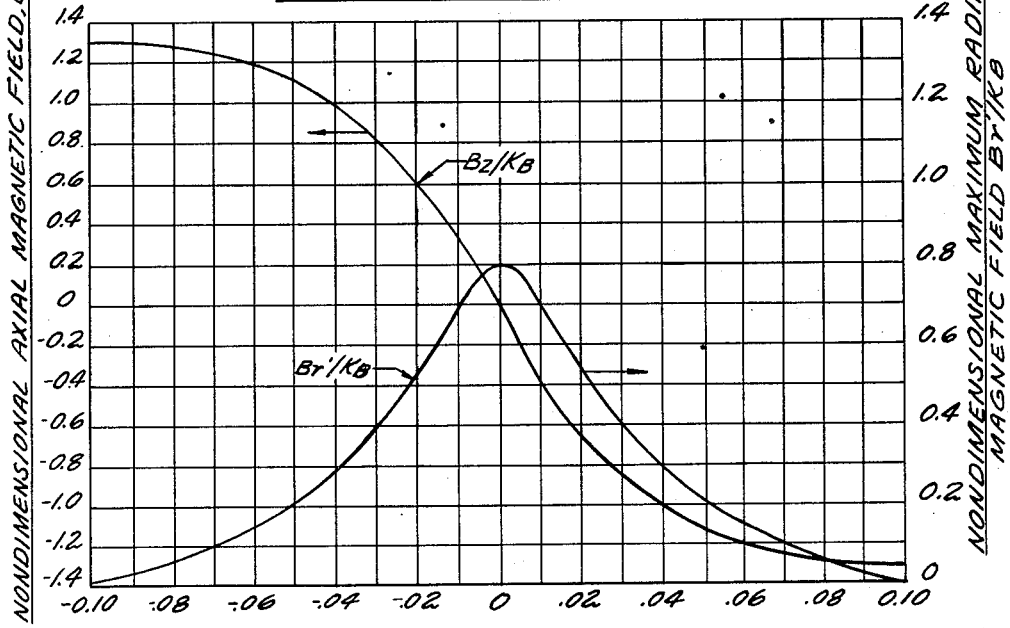
FIG. 7 is a nondimensional plot of axial and radial magnetic fields.

(1) The magnetic field as a function of position of the particle (FIG. 7).
(2) The magnitude of the magnetic field ($K_B$).
(3) The initial velocity of the particle ($V_{10}$, $V_{z0}$).
(4) The initial position of the particle ($r_0$, $Z_0$).
(5) The charge and mass of the particle (assumed to be a proton).

The relationship of interest in this investigation was the ratio of the final rotational kinetic energy of the particle $$\left(\frac{mV_{\perp F}^2}{2}\right)$$

to the initial axial kinetic energy $$\left(\frac{mV_{z0}^2}{2}\right)$$

Solution of Equations 1–4 reveal that the ratio $$\left(\frac{V_{\perp F}^2}{V_{z0}^2}\right)$$

increases with increasing initial radius, increases with decreasing axial velocity (because of the presence of the axial velocity factor in the ratio), and increases with increasing magnetic field strength. In addition, it was determined that if the inital velocity of the particle perpendicular to the field is such that its radius of gyration is small compared to its radial displacement from the axis of the field, the initial perpendicular velocity has no appreciable effect on the energy exchange. This can be seen in FIGS. 5 and 6. The solid lines in FIGS. 5 and 6 also show the relationship between the amount of energy converted and initial radial displacement and magnetic field strength, respectively, for varying initial axial velocities ($V_{z0}$).

Figure 8:
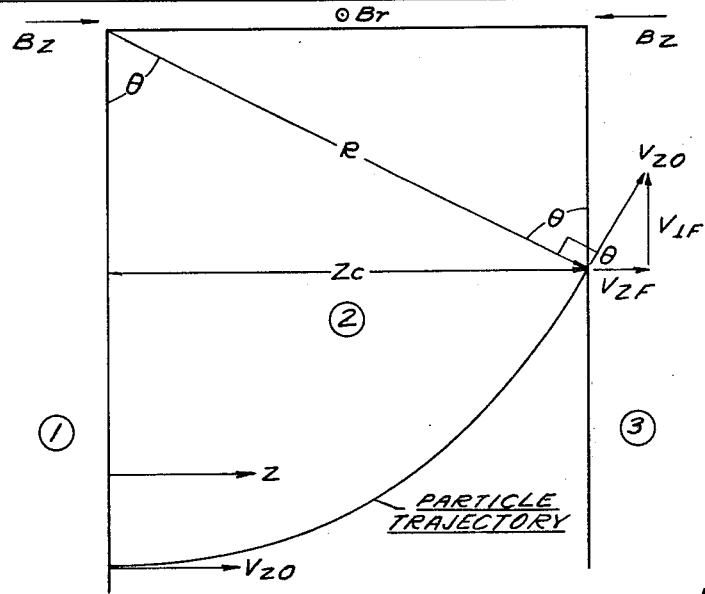
FIG. 8 is a geometric model of the cusped magnetic field.

A simplified geometric model of the cusp region is shown in FIG. 8. The model was analyzed to corroborate the previous mathematical treatment. The trajectory of the particle is the same as the trajectory previously described in connection with FIGS. 3 and 4, and the regions 1, 2 and 3 are comparable to the regions 1, 2 and 3, respectively, of FIGS. 3 and 4. In order to simplify the analysis of the geometric model it was assumed that:

(1) There is an average magnetic field ($\hat{B}_r$) acting in the radical direction over the length of the cusp ($Z_c$).

(2) The displacement ($r$) of the particle from the axis does not change appreciably while traveling through the radial magnetic field.

(3) The radius of curvature ($R$) of the particle is larger than the dimension $Z_c$ (i.e., there is no reflection).

(4) The axial magnetic field is neglected in region 2.

(5) The radial magnetic field is neglected in regions 1 and 3.

It can be seen from FIG. 8 that $$\sin \theta = \frac{V_{\perp F}}{V_{z0}} = \frac{Z_c}{R} \tag{13}$$

From the dynamics of particles in magnetic fields it is known that $$R = \frac{mV_{z0}}{qB_r} \tag{14}$$

Therefore, $$\frac{V_{\perp F}}{V_{z0}} = \frac{qZ_c \hat{B}_r}{mV_{z0}} \tag{15}$$

or the fractional exchange of energy $$\frac{V_{\perp F}^2}{V_{z0}^2} = \frac{q^2(Z_c \hat{B}_r)^2}{(mV_{z0})^2} \tag{16}$$

Substituting Equation 5 in Equation 16, $$V_{\perp F} = \frac{qrZ_c \hat{B}_r'}{m} \tag{17}$$

As can be seen from Equation 17, the final perpendicular velocity ($V_{\perp F}$) is independent of initial axial velocity, proportional to the magnetic field strength, and proportional to the initial radial displacement of the particle from the axis. These results are in complete agreement with the results obtained through the above mathematical treatment.

Figure 5:
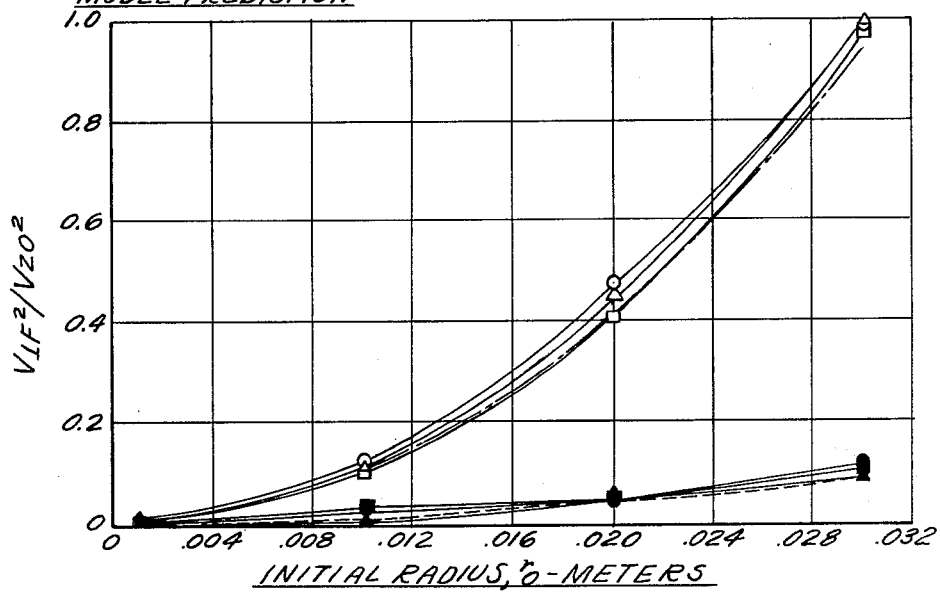
FIG. 5 is a graphic representation of the relationship between the amount of energy transferred and the radial position of the particle from the axis of the magnetic field.
Figure 6:
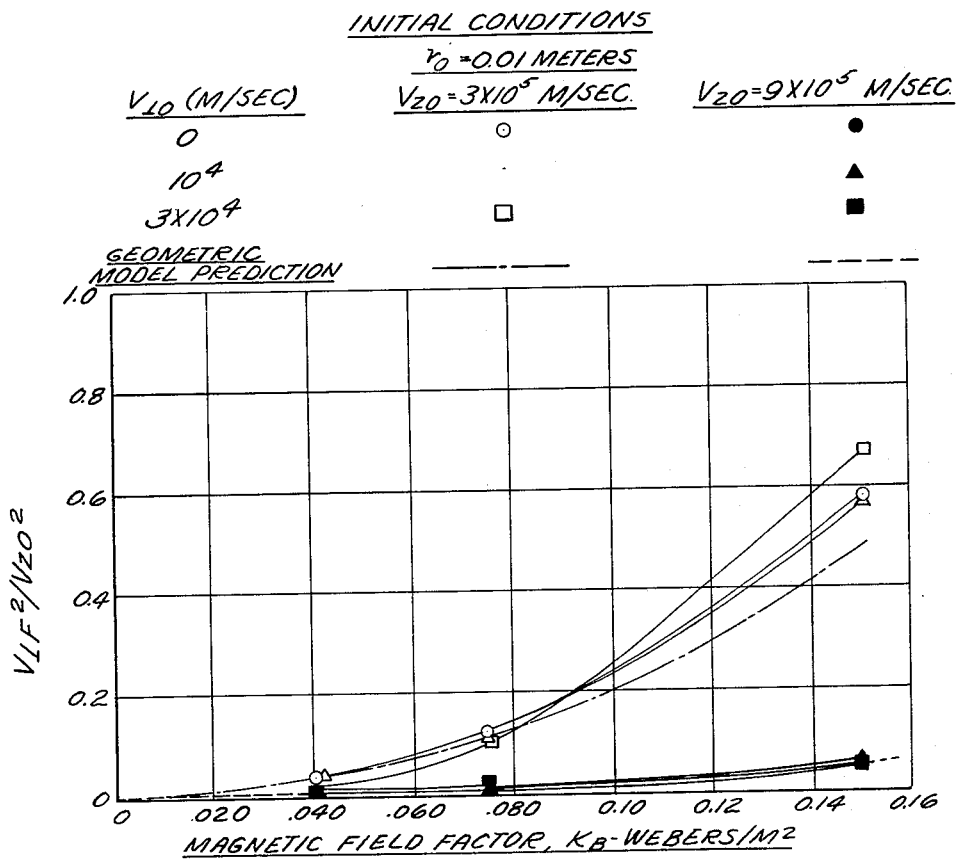
FIG. 6 is a graphic representation of the relationship between the amount of energy transferred and the strength of the magnetic field.

The dashed lines in FIGS. 5 and 6 show the predicted relationships between the amount of energy conversion and initial radial displacement and magnetic field strength, respectively. It is apparent that the geometric model predictions are in very close agreement with the mathematical calculations represented by the solid lines in FIGS. 5 and 6.

As has been stated, it can be seen from Equation 17 that the final perpendicular velocity ($V_{\perp F}$) of the particle is independent of the initial axial velocity ($V_{z0}$). However, as can be seen from Equations 13–15, in order that a significant portion of the initial axial velocity ($V_{z0}$) be converted to final perpendicular velocity ($V_{\perp F}$), the radius of curvature ($R$) of the particles must be equal to or somewhat greater than the cusp dimension ($Z_c$) or else the particles will be reflected back toward the source if ($R$) is less than ($Z_c$). Actually, bearing in mind that the strength of the magnetic field varies in the radial direction, the curved path that a particle assumes under the influence of the radial portion of the magnetic field is not a true circle but rather the particle travels in a path having a mean or effective radius $R$.

The energy exchange in the apparatus described is achieved when ($R$) is equal to or greater than ($Z_c$), since the adiabatic invariants are not applicable and the magnetic moment of the particle can change.

It can thus be seen that we have invented a new method and apparatus for converting axial motion or axial kinetic energy of a charged particle to rotational motion or rotational kinetic energy by means of a cusped magnetic field, wherein the final rotational motion ($V_{\perp F}$) conforms to the relationship $$V_{\perp F} = \frac{qrZ_c \hat{B}_r'}{m}$$

and wherein a significant conversion of initial axial motion ($V_{z0}$) to final rotational motion ($V_{\perp F}$) can be accomplished when $$Z_c \leq R$$

The terms used in all of the preceding discussion have the following meanings:

$B$  Magnetic field, w./m.²
$K_B$  Magnetic field factor, w./m.²
$m$  Mass, $k_g$
$q$  Electronic charge, coulombs
$R$  Radius of gyration, meters
$r, x, y, z$  Co-ordinates, meters
$V$  Velocity, m./sec.
$Z_c$  Representative dimension of cusped field, meters

Subscripts $F$  Final condition
$0$  Initial condition
$\theta, r, x, y, z$  Directional subscripts
$\perp$  Perpendicular to magnetic field

Superscripts

—  Vector quantity
$\wedge$  Averaged quantity

It is to be understood that the invention is not limited to the specific embodiment herein illustrated and described but may be used in other ways without departure from its spirit as defined by the following claims.

We claim:

1. In an energy converting device, a chamber, a pair of co-axial coils associated with said chamber, said coils having opposing magnetic poles when carrying current, means for passing current through each of said coils to generate a cusped magnetic field in said chamber of selected length and strength, and means for directing a charged particle into said chamber along a lineal path removed from the axis of said coils and through said cusped magnetic field, the selected length and strength of said magnetic field being based on the initial energy of the charged particle such that the radius of gyration of said charged particle when passing through said cusped magnetic field is greater than the length of said cusped magnetic field, at least part of the lineal kinetic energy of the charged particle being converted to rotational energy in a one pass transmission through said magnetic field.

2. In an energy converting device, a tube, a first coil surrounding said tube, a second coil surrounding said tube, said second coil being removed from said first coil along the axis of said tube, said coils having opposing magnetic poles when carrying current, means for passing current through each of said coils to generate a cusped magnetic field in said tube of selected length and strength, and means for directing a charged particle into said tube along a path having a component parallel to and removed from the axes of the magnetic fields of said coils when carrying current, the selected length and strength of said magnetic field being based on the initial energy of the charged particle such that the radius of gyration of said charged particle when passing through said cusped magnetic field is greater than the length of said cusped magnetic field, at least part of the lineal kinetic energy of the charged particle being converted to rotational energy in a one pass transmission through said magnetic field.

3. In a motion converting device, a chamber having an axis, means for directing a charged particle into said chamber along a path having a lineal component of motion and removed from said axis, and cusped magnetic field means coaxial with said chamber for converting said lineal motion to rotational motion in a one pass transmission through said magnetic field in accordance with the relation $$V_{1F} = \frac{qrZ_c \hat{B}_{r'}}{m}$$

wheren $V_{1F}$ is the final rotational velocity of the particle, $q$ is the charge of the particle, $m$ is the mass of the particle, $r$ is the initial displacement of the particle from the axis of the magnetic field means, $Z_c$ is the lineal dimension of the cusp, and $\hat{B}_{r'}$ is the average radial strength of the magnetic field in the cusp measured at a point removed from the axis of the field and divided by the distance from the point to the axis, the strength of said magnetic field means being based on the initial energy of said charged particle such that the radius of gyration of said charged particle under the influence of the magnetic field is greater than $Z_c$.

4. In the method of converting the lineal component of motion of a charged particle into rotational motion, the steps of establishing a cusped magnetic field of selected length and strength and having an axis, directing a charged particle along a path having a lineal component of motion with respect to the axis of said cusped magnetic field and at a distance removed from said axis, and passing said charged particle through said cusped magnetic field, the selected length and strength of said magnetic field being based on the initial energy of the charged particle such that the radius of gyration of said charged particle under the influence of said cusped magnetic field is greater than the length of said cusped magnetic field, whereby part of the axial kinetic energy of the charged particle is converted to rotational kinetic energy in a one pass transmission through the cusped magnetic field.

5. In the method of converting the lineal component of motion of a charged particle into rotational motion, the steps of establishing a magnetic field of selected length and strength and having an axis and a substantially radial component with respect to said axis and a component at an angle to the radial component, directing a charged particle along a path having component of motion parallel to said axis and at a distance removed from said axis, passing said charged particle through said radial component of the magnetic field whereby said particle assumes a curved path, and passing said particle into said angled component of the magnetic field whereby said charged particle is caused to rotate in a one pass transmission through said magnetic field, the selected length and strength of said magnetic field being based on the initial energy of the charged particle such that the length of said substantially radial component of the magnetic field along said axis is less than the mass of said charged particle times the lineal velocity divided by the charge times the average strength of the radial component of the magnetic field.

6. In the method of converting the lineal component of motion of a charged particle to rotational motion, the steps of establishing a magnetic field of selected length and strength and having an axis and radial and axial components with respect to said axis, directing a charged particle along a path having a component of motion parallel to said axis and at a distance removed from said axis, and passing said charged particle through said radial component of the magentic field and into said axial component of the magnetic field whereby said charged particle assumes a curved path under the influence of said radial component and is caused to rotate under the influence of said axial component in a one pass transmission through said magnetic field, the selected length and strength of said magnetic field being based on the initial energy of said charged particle such that the axial length of said radial component is less than the radius of gyration of said charged particle in said radial component.

7. In the method of converting the lineal component of motion of a charged particle to rotational motion, the steps of establishing a magnetic field having an axis and a substantially radial component with respect to said axis and a component at an angle to the radial component, directing a charged particle along a path having a lineal component of motion parallel to said axis and at a distance removed from said axis, and passing said charged particle through said radial component of the magnetic field and into said angled component of the magnetic field to convert part of the lineal motion of the charged particle to rotational motion in a one pass transmission through said magnetic field in accordance with the relation $$V_{1F} = \frac{qrZ_c \hat{B}_{r'}}{m}$$

wherein $V_{1F}$ is the final rotational velocity of the particle, $q$ is the charge of the particle, $m$ is the mass of the particle, $r$ is the initial displacement of the particle from said axis, $Z_c$ is the lineal dimension of said radial component, and $\hat{B}_{r'}$ is the average strength of the radial magnetic field measured at a point removed from said axis and divided by the distance from the point to the axis.

References Cited by the Examiner

UNITED STATES PATENTS 2,961,559  11/60  Marshall _____ 176—8

FOREIGN PATENTS 1,230,149  3/60  France.

OTHER REFERENCES

Proceedings of the Second United Nations International Conference on the Peaceful Uses of Atomic Energy, vol. 31, United Nations, 1958, pp. 171–176.

CARL D. QUARFORTH, *Primary Examiner.*

REUBEN EPSTEIN, LEON D. ROSDOL, *Examiners.*